United States Patent
Lloyd

[11] Patent Number: 6,135,193
[45] Date of Patent: Oct. 24, 2000

[54] AUTO SHADE WITH DECORATIVE REFLECTIVE SURFACE

[76] Inventor: Virginia R. Lloyd, 263 Bell Canyon Rd., Bell Canyon, Calif. 91307

[21] Appl. No.: 09/193,315

[22] Filed: Nov. 16, 1998

Related U.S. Application Data

[60] Provisional application No. 60/065,755, Nov. 17, 1997.

[51] Int. Cl.[7] .................................................. B60J 1/20
[52] U.S. Cl. ............................. 160/370.23; 160/370.21; 160/DIG. 2; 160/DIG. 3; 296/97.7; 296/97.8
[58] Field of Search .................................. 160/84.04, 89, 160/237, 370.21, 370.23, DIG. 2, DIG. 3; 296/97.7, 97.8, 97.9

[56] References Cited

U.S. PATENT DOCUMENTS

| | | | |
|---|---|---|---|
| 4,202,396 | 5/1980 | Levy | 160/107 |
| 4,652,039 | 3/1987 | Richards | 160/84.04 X |
| 4,727,920 | 3/1988 | Siegler | 160/370.23 X |
| 4,751,115 | 6/1988 | Smith et al. | 428/12 |
| 4,958,880 | 9/1990 | Champane | 160/370.23 X |
| 5,267,599 | 12/1993 | Kim | 160/370.23 |
| 5,324,090 | 6/1994 | Lehnhoff | 160/370.23 X |
| 5,570,735 | 11/1996 | Chu | 160/370.23 |
| 5,762,124 | 6/1998 | Tseytlin et al. | 160/370.23 |

*Primary Examiner*—Daniel P. Stodola
*Assistant Examiner*—Bruce A. Lev

[57] ABSTRACT

A sunscreen having a plurality of hinged panels deployed with respect to one another in order to provide an elongated integral panel in an operative position installable across an auto or dwelling window. The external surface of the sunscreen carries a reflective and heat absorption foil surface which carries translucent and opaque portions formed by the presence of graphic subject matter. The graphic subject matter of pictorial indicia determines the areas of density for determining the translucent and opaque portions. The foil composition carrying the pictorial subject matter is of heat absorption materal so that temperature reduction within the interior of a dwelling or automobile is lessened through the reflective and heat absorption characteristics of the composition itself. The screen has a stabilizing central base with a plurality of foldable panels on either side of the central portion that are extendable.

1 Claim, 1 Drawing Sheet

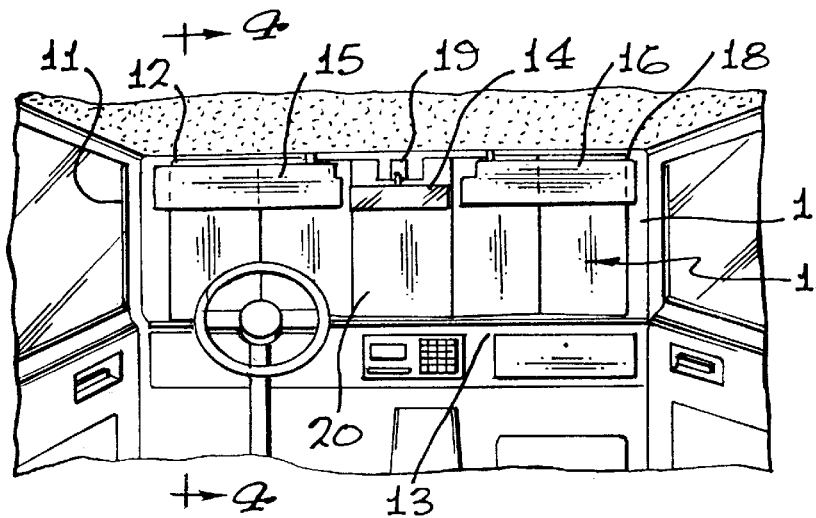
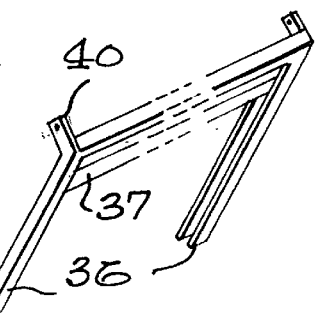
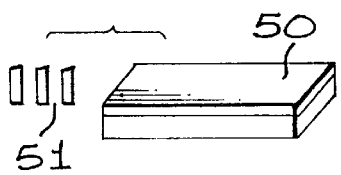
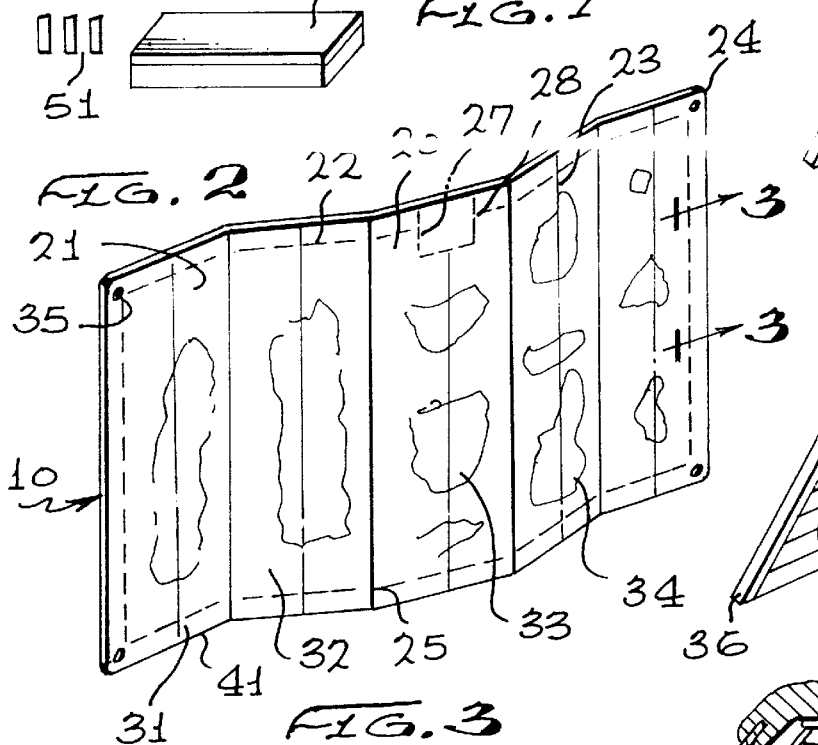
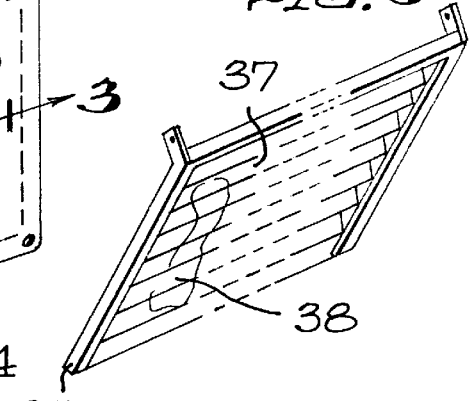
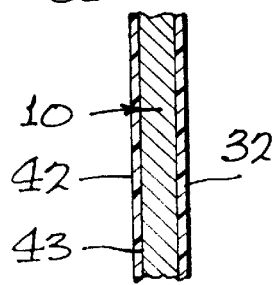
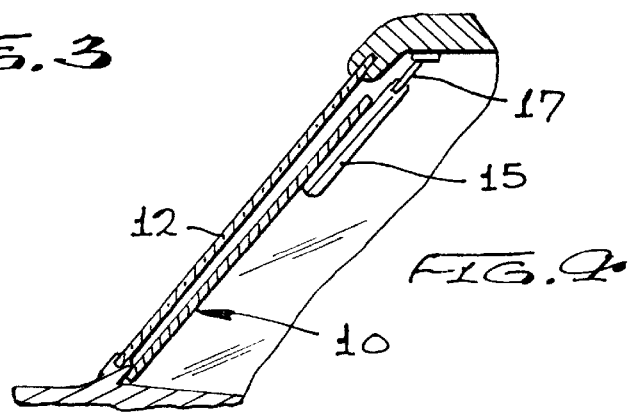

AUTO SHADE WITH DECORATIVE REFLECTIVE SURFACE

Priority based on Ser. No. 60/065,755, filed Nov. 17, 1997.

BACKGROUND OF THE INVENTION

1. Field of the Invention

The present invention relates to the field of sunscreens for windows, and more particularly to a novel poster-type sunscreen having a reflective decorative surface and heat absorption characteristics for use in protecting the interior of a dwelling or automobile.

2. Brief Description of the Prior Art

Conventionally, it has been the usual practice to employ a variety of folding window shields that are detachably carried against the inside windows of a vehicle such as an automobile. In this connection, the shields interfere with sunrays so that the rays do not enter the interior of the vehicle which would normally cause damage and which would overheat the auto interior. Difficulties and problems have been encountered with conventional auto sunshields, which stem largely from the fact that their sole purpose and function is to interfere with the sunrays. The conventional shields do not absorb heat nor do they lessen the effect of interior heating by absorbing and/or reflecting sunrays away from the shield. Also, the exterior surface of conventional shields does not include graphic subject matter that controls or determines the degree of reflectivity on the external surface. Such graphic subject matter used in conventional shields is very primitive and in no way affects the sunray penetration of the shield. Conventional use is strictly an ink imprint on the surface and does not contain characteristics for heat absorption.

Furthermore, prior attempts to provide heat absorption shields are found in the area of heat sinks and with respect to sunray shields, disclosure is made in U.S. Pat. No. 4,751,115. Although such disclosures are useful in providing decorative reflective material on a shield suitable for absorbing heat, the construction of the shield itself is difficult to install on a temporary basis above the dashboard and across the windshield of an automobile. This stems largely from the fact that substantial use must be made of downwardly depending pivotal visors which hold the top portion of the shield in position while the bottom portion of the shield rests on the dashboard. Such an installation is very loose and does not provide for adequate adjustment about the rearview mirror which may either be secured to the roof above the windshield or directly onto the windshield itself. Also, conventional windshield sunshades are of an accordion construction so that they may be folded by providing scorelines between adjacent panels that comprise the shield. The panels are identical in length and width and do not have a centerpiece or panel from which the accordion type panels are outwardly deployed. By utilization of a central panel, the sunshield is stabilized when installed across the back side of a windshield. Such a basic sunscreen of the accordion type is disclosed in U.S. Pat. No. 4,202,396.

Yet another problem with conventional sunscreens is that once deployed across the window, the user must completely install the screen or completely remove it. No provision is made for an installation whereby the sunscreen can be opened or closed in order to permit ready storage or visual viewing while the screen is permanently installed. Although prior venetian blind devices as well as mini-blind screens have been employed in household uses, such are not decorative nor do they provide heat absorption materials.

Therefore, an existing need is present to provide a novel sunscreen of either a mini-blind or flat surface type which reduces the passage of sunrays therethrough by reflective means and which incorporates heat absorption characteristic in the materials used. Graphic subject matter carried on a reflective surface would provide areas of selective translucency as well as areas of relative opaqueness so that a tolerable reflective surface to oncoming personnel can be provided. Such a sunscreen means includes not only a plurality of panels connected together in a stabilize manner for installation but also includes a plurality of slats arranged in a horizontal manner and activated by a control similar to that of a venetian blind.

SUMMARY OF THE INVENTION

Accordingly, the above problems and difficulties are avoided by the present invention which provides a novel sunscreen having a plurality of panels or slats which are activated with respect to one another in order to provide an elongated panel in an operative position across an auto or dwelling window. The external surface of the sunscreen carries a reflective surface which is composed of a plurality of translucent and opaque portions. The graphic subject matter is of a refined portrayal of pictorial indicia which subject matter determines the areas of density for determining translucent and opaque portions. The screen carrying the pictorial subject matter is of heat absorption material so that temperature reduction within the interior of a dwelling or automobile is lessened through the reflective and heat absorption characteristics of the inventive sunscreen.

In one form of the invention, the screen has a stabilizing central base with a plurality of foldable portions or panels on either side of the central portion that are extendable into the operative position across the window. In another form, the plurality of panels may be termed slats which pivot about the longitudinal axis between open and closed positions while the support and actuating means for the slats remain in a fixed position across the window.

Therefore, it is among the primary objects of the present invention to provide a novel sunscreen or poster screen which incorporates both sunray reflection and solar heat absorption characteristics and which provides a suitable mounting means for retaining the sunscreen in a fixed or removable position across a window or windshield.

Another object of the present invention is to provide an inexpensive means for reducing the interior temperature of an automobile by releasably mounting a sunscreen across the windshield wherein the screen or shield uses a mounting means which may take into consideration the rearview mirror whether it is mounted on the windscreen or on the roof of the automobile.

Still another object of the present invention is to provide a poster or sunscreen means carrying graphic subject matter over a reflective surface so as to provide irregular areas of translucency and opaqueness and which includes a plurality of slats or panels that may be operably moved into operating position either vertically or horizontally.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a rear elevational view of the inventive poster and sunscreen means illustrated as being installed across the interior of the front windshield of a vehicle;

FIG. 2 is a perspective view showing the front side of the poster and sunscreen of the present invention illustrating the reflective surface and graphic subject matter carried thereon;

FIG. 3 is an enlarged fragmentary view, in section, of a portion of the poster and sunscreen means shown in FIG. 2 as taken in the direction of arrows 3—3 thereof;

FIG. 4 is a cross-sectional view of the poster and sunscreen means of the present invention installed immediately behind the windscreen of an automobile;

FIG. 5 is a perspective view of another embodiment of the present invention showing a plurality of slats arranged in a mini-blind construction with the mounting means of a permanent securement;

FIG. 6 is a view similar to the view of FIG. 5 illustrating the blinds in an open position so that a viewer can see directly through the slats without removal of the mounting means; and FIG. 7 is a perspective view of a container and color markers.

DESCRIPTION OF THE PREFERRED EMBODIMENTS

Referring to FIG. 1, the novel solar and poster screen means of the present invention is illustrated in the general direction of arrow 10 and is shown in a typical installation extending across the interior of the front windshield of a vehicle. However, it is to be understood that the screen means may also be employed for covering the back side of a window in a dwelling. The opposite ends of the screen 10 extend between the opposite window jambs, identified by numerals 11 and 12, and across the top of the dashboard, indicated by numeral 13. In one form, the solar screen is maintained in position by means of the mid portion of the screen resting against the back side of a vehicle mirror 14 while the flaps or visors 15 and 16 are rotated to a position against the back side of a screen adjacent to the upper edge marginal regions at the ends of the screen. It is to be particularly noted that the visors 15 and 16 are carried on a universal mount, such as mounts 17 and 18 respectively, while the mounting for mirror 14 is a fixed securement by means of a fixture 19.

Referring now in detail to FIGS. 1 and 2, it can be seen that the shield or screen 10 comprises an elongated board which is substantially rectangular in configuration. The length of the board is divided into a plurality of sections separated by a central base panel, identified by numeral 20. A pair of panels 21 and 22 is shown integrally connected to one side of the base panel 20 while panels 23 and 24 are connected to the opposite side of the base panel 20 and extend outwardly from the opposite side. It is to be noted that each of the respective panels 21 and 22 as well as 23 and 24 are of identical length and width while the base panel 20 is of the same length but is at least twice the width of the side panel. By this construction, the base panel 20 becomes a stabilizing panel which is stiffer and more stable when the shielf or screen is placed in the operative position shown in FIG. 1.

The side panels 21, 22 and 23, 24 are connected to each other as well as to the opposite sides of the base panel 20 by means of a score line, such as score line 25, whereby the length of the board may be folded accordion-style into a storage configuration wherein the side sections are laid upon one another in a stack with the base panel 20 at the bottom. When unfolded, the sections and base panel are integral with one another. In order to further retain the length of the board in position against the back side of the windshield, the opposite ends of the unfolded board may be jammed or forcibly urged into a binding relationship with the respective window frame or jambs 11 and 12 respectively. In this situation, the visors 15 and 16 as well as the mirror 14 need not be employed for holding the shield in position.

FIG. 2 also illustrates that the upper edge marginal region of the central panel 20 may include a flap 26 that is defined by perforations 27 and 28 and by a fold line 30. By this means, in order to accommodate the mirror 14 and/or its fixture 19, the flap may be separated from the central panel by the perforations 27 and 28 and the flap 26 may be folded on the fold line 30 so as to provide an aperture or opening which would accommodate the mirror or fixture.

Furthermore, it can be seen that the central area of the board is defined by an edge marginal region serving as a border, which is identified by numeral 31. The front side of the screen or shield 10 is illustrated in an unfolded condition and in this condition, it can be seen that the front side of the shield 10 includes a surface on which a thin foil of reflective material 32 is laminated therewith. The reflective coating or foil 32 includes pictorial subject matter which ranges in density from a relatively opaque section, represented in general by numeral 33, to a relatively translucent section, indicated by numeral 34. These latter sections or portions provide a surface differential in sunlight reflection that provides an overall muted effect so as not to be bothersome to oncoming traffic or oncoming observers. The overall configuration of the board is rectangular having straight edges on its side as well as its end. The respective score fold lines are arranged in fixed parallel spaced-apart relationship and divide the length of the board into equal segments or sections on each side of the central base panel 20 so that they may be folded over upon themselves in a stacked manner for storage purposes. When so stacked, the board may easily be slipped through the open end of a sleeve-like container for transport or storage.

In constructing the solar screen, shield or poster 10, it is noted that the board may be a length of kraft paper on which the "solar foil" is laminated. The foil or coating is a reflective foil or acetate and the reflective foil is laminated to one surface of the bleached kraft paper backing that is carried on an E flute corrugated board. Prior to lamination of the foil to the kraft paper board, graphic representations or indicia are applied to the foil surface. First, the surface is treated for printing, followed by laminating the foil to the kraft paper of the board. Next, the graphic subject matter or indicia is printed so that the overall characteristics of the graphics are muted between sections of translucent areas or other portions or sections which are opaque. If desired, a protective varnish or coating may be placed over the printed graphics on the foil. The folds 25 take on a "set" to provide an accordion folding effect permitting expansion for operative use or folding over upon itself for storage purposes.

In actual practice, the screen or shield board 10 is deployed unfolded to the position shown in FIG. 2 and if needed, the flap 26 is separated along its sides 27 and 28 and folded along fold line 30. The board is placed against the back side of the windshield so that the graphic or indicia carried on the foil on the front of the board is against the windshield. If applicable, the top marginal region of the base panel 20 can rest against the back side of the mirror and the visors 15 and 16 can be employed to further retain the reflective board in position. The opposite ends may be tucked into the sides of the front windshield frame and the lower edge of the board can be carried on the dashboard adjacent to the lower portion of the windshield. Such an arrangement of retention with the visor 15 is illustrated in FIG. 4. However, it is to be understood that the visors may not be needed if alternate attachment means are provided, such as suction cups or the like. For such mounting, it is to be noted that the corners of the board 10 include openings, such as represented by opening 35, so that a suitable fastener can be attached thereto. The fastener may couple directly to the back side of the windshield or may be detachably connected along the frame of the windshield.

Referring now to FIGS. 5 and 6, another embodiment of the invention is illustrated wherein a permanent mount, such as frame 36, is provided for holding a plurality of slats, such as slat 37. The slats are arranged in parallel relationship between the opposite sides of frame 36 and are activated to a fully deployed position in FIG. 5 and a raised position in FIG. 6. In the position shown in FIG. 5, the slats represent a plurality of mini-blinds which, when rotated about their longitudinal axis, form a barrier preventing sunlight from passing through. When pivoted to an open position, the slats permit sunlight and viewing to pass through. As described previously with respect to the screen or shield 10, the plurality of slats on the exterior side are provided with a film or coating having a reflective surface and having opaque graphics, such as graphic 38, carried thereon. In FIG. 6, the slats have been raised to the top of the form 36 so that the slats do not interfere with viewing or passage of light beams. The frame 36 may be carried on the side and top jambs of a window in a dwelling. Attachment to the jamb may be made by fixtures 40.

A cushion material 41 is carried on the backing board along the entire length of the board for protection of the dashboard when the backing board is in its opened or operative position. The foil is of aluminum composition for maximum heat absorption and sunray reflection. Thus, the auto interior is maintained at a reduced temperature. The aluminum foil overcomes problems when Mylar film is used since the foil graphic displays are crisper in appearance and more defined. Also, Mylar film does not have acceptable heat absorption qualities or heat dissipation qualities or conduction capabilities so as to keep the auto interior at a reduced temperature. The shade includes a reinforcement layer 42 of insulation afixed to the back side of the backing board. A white-coated surface 43 carried on the layer 42 cooperates with the foil backing board and insulation to maintain the auto interior at a reduced temperature.

A kit having the foil backing board, a storage container 50 and color markers 51 are included, so that a person can place indicia of his or her own creation onto the display surface.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an automotive vehicle provided with auto visors and a window upwardly projecting from a dashboard and having an outside and an inside, an auto sun shade improvement which comprises:

a foldable sunscreen having an elongated rigid backing board composed of heat-absorbing material having a front planar surface immediately adjacent to said window inside and a rear surface;

a thin non-expandable foil carried on said sunscreen board front planar surface in fixed securement therewith so as to be integral across a central and total surface thereof;

said foil characterized as being reflective to sunlight and heat absorption;

a plain border carried on said foil about an edge marginal region of said sunscreen board front planar surface so as to define a central display area on said front planar surface;

indicia carried on said central display area of said foil separating said foil surface into varying translucent and opaque areas;

a plurality of parallel spaced-apart score lines disposed through said foil and said backing board across said backing board dividing said foil and said backing board into a plurality of elongated parallel panels extending across said foil and said backing board whereby said panels are folded over upon themselves about score lines to provide a stacked storage condition and extending said panels to an unfolded position to provide an operative condition;

said plurality of panels having a middle panel of greater width than the width of adjacent panels whereby said indicia appears on said middle panel;

said backing board being composed of corrugated cardboard and said foil composed of aluminum for heat absorption and sunlight reflective properties;

said indicia on said reflective foil provide an overall surface defined by said translucent and said opaque areas;

said auto visors, said mirror, said window, and said dashboard constitute a retention means to removably support said backing board in its operative condition;

a strip of protective cushion material attached to said backing board along a lower edge adjacent to said edge marginal border engageable with said dashboard when said backing board is in said operative position;

said foil composition and said backing board composition cooperate to prevent increasing interior temperature of the auto;

said foil extends across said backing board providing maximum surface coverage of said backing board for maximum sun ray reflection and heat absorption;

said indicia is applied to said foil on said panels and surrounded by said edge marginal border;

said backing board includes a top edge and a lower edge terminating at opposite sides with rounded corners easing installation of said backing board on said dashboard against said window;

said auto sun shade includes a kit consisting of:
 a. said foil and said backing board;
 b. a storage container;
 c. color markers;

said backing board includes a layer of insulation; and a white surface coating carried on said insulation layer cooperating with said foil, said insulation and said backing board to maintain the auto interior at a reduced temperature.

* * * * *